United States Patent Office 3,170,868
Patented Feb. 23, 1965

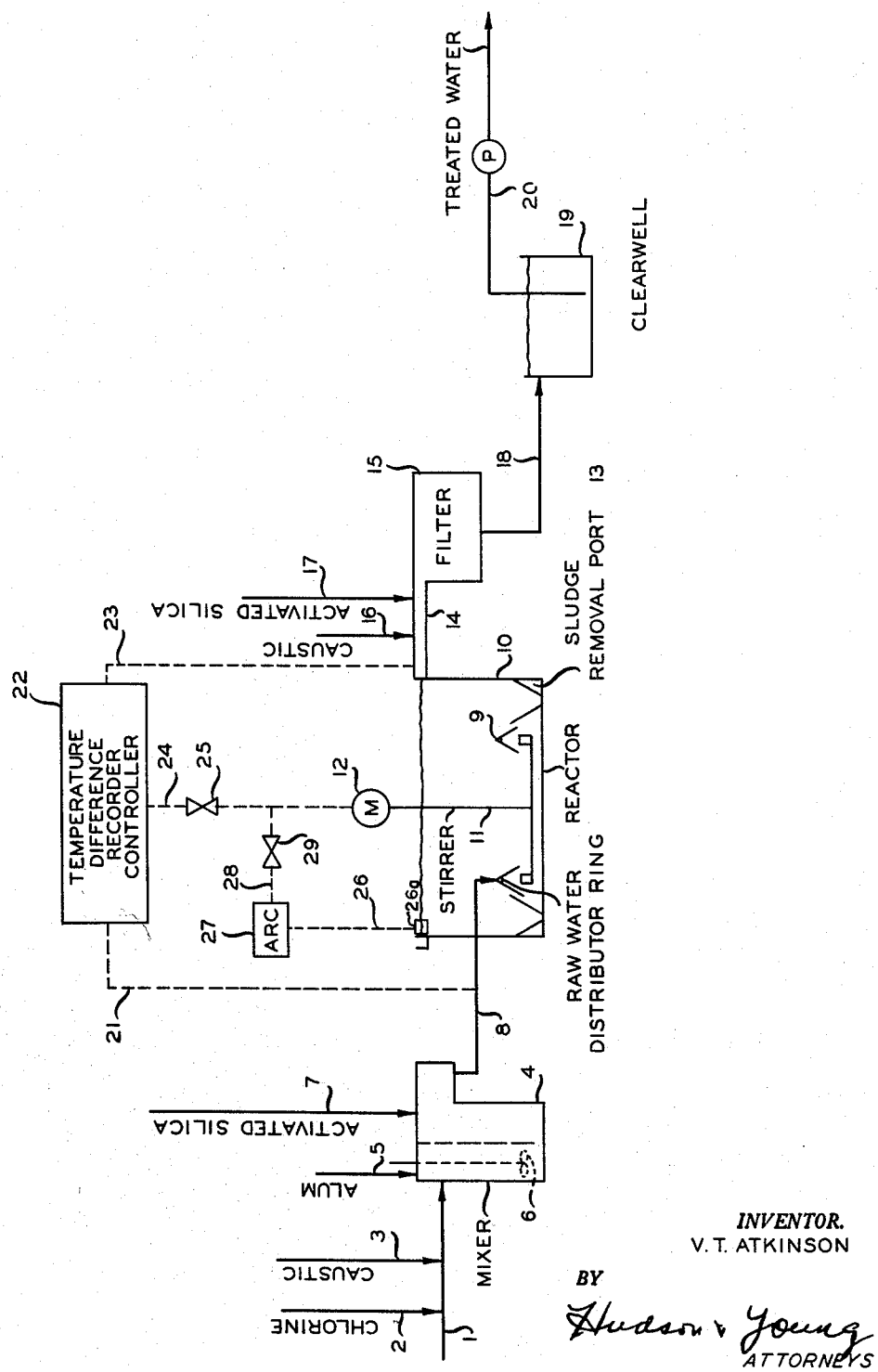

3,170,868
WATER TREATMENT WITH TEMPERATURE CONTROL
Vernon T. Atkinson, Pasadena, Tex., assignor to Phillips Petroleum Company, a corporation of Delaware
Filed Sept. 11, 1961, Ser. No. 137,189
5 Claims. (Cl. 210—49)

This invention relates to a method and apparatus for treating water. In one of its aspects, the invention relates to a method and apparatus for operating and agitating a water treating zone in which a solid is formed and separated from the water during treatment, which solid tends to rise to the surface of the water whenever water entering the treating zone is sufficiently warmer than water in the treating zone, due to the combined effect of convection currents and agitating. In another aspect, the invention relates to method and apparatus for treating water wherein the tendency of solids formed during the treatment to overflow the water treating zone is reduced. In still another aspect, the invention relates to method and apparatus for separation of solids from water.

Among the several methods used to treat raw water for removal of deleterious compounds is the coagulation process. In the coagulation process, an aluminum or iron salt is used to produce a finely divided precipitate of the hydrous oxide. These hydrous oxide particles are flocculated into larger masses, with the suspended turbidity particles, bacteria, micro-organisms, etc., being enmeshed in the floc. Formation of a strong floc is dependent on several variables including pH, temperature, and agitation of the water. The usual coagulation process comprises the steps of mixing into the water the coagulant chemicals, flocculation of the coagulant and impurities, and sedimentation of the resulting floc. It is usually desirable that the mixing of the coagulant chemical be accomplished rapidly in order to obtain proper dispersion. In contrast, the steps of flocculation and sedimentation require gentle agitation in a relatively quiescent zone. In a large-scale water treating system, the mixing step is usually accomplished in a relatively small, highly agitated vessel. The water is then passed to a large reaction vessel, which is often a large diameter relatively shallow open pond having a low-speed stirrer or other means of gentle agitation. In this latter reactor, flocculation or "building" of the precipitate particles and their subsequent settling from the water occurs. The water is then usually passed to a filter for final clarification. It has been observed in the past that upsets occasionally occur in such a reactor. These upsets consist of the floc rising to the top of the reactor, rather than settling to the bottom, as is desired for convenient withdrawal of the solids. When the solids rise to the top, they pass out of the reactor along with the treated water to the downstream filter, and thus cause frequent clogging of this filter requiring a high maintenance incidence to this filter.

I have now discovered that agitation in the reactor derives from two sources, namely the usual agitation and also convection currents in the reactor. I have further discovered that, for proper operation of such a reactor, both of these sources of agitation must be considered. Thus, when agitation in the reactor caused by convection currents increases, agitation by such as stirring must be decreased in order to prevent the upsets mentioned. Conversely, when agitation by convection currents is at a minimum, agitation by such as stirring must be increased in order to effect the proper flocculation. I have further discovered that agitation due to convection currents arises from relatively small changes in the temperature of the water being treated.

Accordingly, it is an object of this invention to provide improved process and apparatus for treating water. It is another object of this invention to provide process and apparatus for treating water by flocculation. It is a further object of this invention to provide process and apparatus whereby solids formed during water treatment are allowed to settle in a contact reactor rather than being carried therefrom. It is still another object of this invention to minimize temperature effects in the coagulation treatment of water.

Other aspects, objects, and the several advantages of my invention will become apparent upon a study of the drawing, this disclosure, and the claims appended thereto.

According to my invention, there is provided a method and apparatus for operating and agitating a water treating zone in which a solid is formed and separated from the water during treatment, which solid tends to rise to the surface of the water whenever water entering the treating zone is sufficiently warmer than water in the treating zone, due to the combined effect of convection currents and the agitating, which comprises agitating the water under treatment in the zone, detecting tendency of the solid to rise, and, whenever the solid tends to rise undesirably, reducing the degree of agitation and vice versa. There is further provided a method and apparatus for treating water which comprises mixing a treating agent with the water which effects formation of a solid constituent in the water, agitating the admixture of the agent and the water, measuring the increase in temperature of the water from a point upstream to a point downstream of the agitating, and controlling the rate of the agitating in direct relation to said measuring so as to prevent undue rising of the solid in the water. According to a presently-preferred embodiment of my invention, the tendency of solids to rise in the reaction zone is detected by a measurement of differential temperature from a point entering the reaction zone to a point leaving the reaction zone. In another embodiment of my invention, the tendency of solids to rise is detected by measuring turbidity of water, preferably in an upper portion of the reaction zone. In another embodiment of my invention, the tendency of solids to rise is detected by measuring the density of water, again preferably in an upper portion of water in the reaction zone.

Referring now to the drawing, there is shown a coagulation water treatment system wherein raw water is introduced from a suitable source by way of conduit 1. Chlorine is added by way of conduit 2, and caustic is added by way of conduit 3. The raw water is then passed to a mixing vessel 4, wherein a flocculating agent such as alum is added by way of conduit 5. This mixing vessel contains a suitable agitator such as stirrer 6. A suitable coagulating aid, such as activated silica, is then added to the water by way of conduit 7. The water is then passed by way of a conduit 8 to a water distribution ring 9 contained in the reactor 10. Water in the reactor is agitated by suitable means such as stirrer 11 driven by a motor 12. Floc which precipitates and settles in reactor 10 is removed therefrom by way of a sludge removal port 13. After suitable residence time, clear water is overflowed by way of a flume 14 to a filter 15. Additional treating agents such as caustic, by way of conduit 16, and activated silica, by way of conduit 17, are added in flume 14. Filtered water is passed by way of conduit 18 to a clear well 19, from which the final treated water is removed by way of conduit 20 as needed for utility.

According to one embodiment of my invention, temperature of the influent water to the reactor is sensed by a suitable sensing means, and a signal proportional to this temperature is passed by way of a signal conduit 21 to a temperature difference recorder controller 22. In a like manner, temperature of the effluent water from the reactor is sensed and its signal passed to the recorder controller 22 by way of a signal conduit 23. A signal proportional to the temperature difference is passed by way of signal conduit 24 and valve 25 to the motor 12, which is a variable speed motor. According to another embodiment, a property of the water such as turbidity or density is measured by a sensing device such as indicated schematically at 26A, preferably in an upper portion of the reactor, and the resulting analysis signal is passed by way of conduit 26 to an analyzer recorder controller 27. The output signal of this controller 27 is passed by way of signal conduit 28 and valve 29 to the variable speed motor 12.

The following specific example will serve to further illustrate my invention.

EXAMPLE I

Reactor 10 is an 87 foot diameter by 20½ feet deep circular concrete basin. Motor 12 is a 5 horsepower U.S. Vari-Drive motor with a Foote Brothers Type 10–150 WH gear reducer. Treating agents were added in accordance with the following table.

| Agent | Point of Addition | Resulting Concentration, p.p.m. |
| --- | --- | --- |
| Chlorine | 2 | 1–4 |
| Caustic | 3 | 0–12 |
| Alum | 5 | [1] 50–75 |
| Activated Silica [2] | 7 | [3] 4–6 |
| Caustic | 16 | 8–14 |
| Chlorine | To flume 14 | 0.2–1.0 |
| Activated Silica [2] | 17 | [3] 0.5–1.5 |

[1] Calculated as filter alum, added as solution containing 48.5 percent filter alum.
[2] Prepared by reacting sodium silicate with chlorine.
[3] Calculated as $SiO_2$.

This unit delivered 8,000 gallons per minute with an average effluent turbidity in conduit 18 or less than 10 parts per million. Agitator speed was varied in accordance with the following table:

Temperature difference, ° F.
  between signals 21 and 23
  referred to signal 21:        Speed of stirrer 11, r.p.m.
    2° F. or more colder _____ 2.8
    1° F. to 2° F. colder _____ 2.3
    0° F. to 1° F. colder _____ 1.8
    0° F. to 1° F. warmer _____ 1.2
    1° F. or more warmer _____ 0.7

Operation of the treating unit in the manner described resulted in substantially no upsets, i.e., loss of floc to the filters. Operation of the stirrer above these rates causes intermittent loss of floc from the reactor to the filter, thereby plugging off the latter.

It is thus seen that the tendency of floc to rise in the reactor results from the combined effect of convection currents caused by temperature differential across the reactor and agitation caused by the stirrer. By sensing the tendency of the solids to rise in the reactor and compensating in the amount of agitation provided by such as a stirrer, upsets are prevented. In addition to measurement of temperature differential across the reactor, other means of detecting tendency of solids to rise in the reactor suitably include measurement of turbidity or density of the water in the reactor, preferably in an upper portion thereof.

A suitable controller for use as items 22 or 27 is the Foxboro Model 58, although it is obvious that other pneumatic or electric controllers can be used.

Reasonable variation and modification are possible within the scope of this disclosure, drawing, and appended claims to the invention, the essence of which is that there is provided a method and apparatus of treating water wherein the tendency of solids formed during treatment to rise undesirably during their settling from the water is detected and agitation of the settling zone is reduced in accordance therewith and vice versa.

I claim:

1. A method of treating water which comprises adding a coagulant to said water, agitating by stirring at a rate of 0.7–2.8 r.p.m. the admixture of said water and said coagulant in a relatively quiescent reaction zone, allowing solids resulting from said adding to settle in said zone, withdrawing clarified water from said zone, measuring the temperature difference of water upstream of and downstream of said zone, and controlling the rate of said agitating in response to said measuring in accordance with the following relationships.

Temperature difference,
  upstream is:                  Agitation speed, r.p.m.
    2° F. or more colder _____ 2.8
    1° F. to 2° F. colder _____ 2.3
    0° F. to 1° F. colder _____ 1.8
    0° F. to 1° F. warmer _____ 1.2
    1° F. or more warmer _____ 0.7

2. The method of claim 1 wherein said coagulant comprises aluminum sulfate.

3. Apparatus for treating and agitating water which comprises a settling vessel, water agitating means in said vessel, means to introduce water and a treating agent into said vessel, means to remove treated water from said vessel, means to remove solids from said vessel, signal producing means comprising a first temperature sensing means for sensing temperature of water entering said settling vessel, a second temperature sensing means for sensing temperature of water leaving said vessel and temperature comparing means for comparing the temperature sensed by said first and said second temperature sensing means and for producing a signal representative thereof, and control means adapted to control said water agitating means in response to said signal producing means.

4. A coagulating process in which chemicals are added to water and in which a solid is formed and separated by settling from the water during treatment, which solid tends to rise to the surface of the water when water entering the treating zone differs in temperature from that of the water in the said treating zone due to the combined effect of convection currents and said agitating which comprises the steps of agitating said water under treatment in said zone, measuring the temperature of water entering the said zone, measuring the temperature of water leaving the said zone, utilizing the difference in temperature between said water entering and said water leaving the said zone to generate a signal representative of said difference and utilizing said signal to control the degree of agitation.

5. A method of controlling the settling rate of floc in a water treating zone which comprises the steps of
  (1) measuring the difference in temperature between the water entering and leaving the said treating zone,
  (2) generating a signal representative of said difference in temperature which signal is representative of the tendency of said floc to rise in said treating zone, and
  (3) controlling the degree of mechanical agitation of said treating zone responsive to the said signal so that the total amount of agitation due to the effect of said mechanical agitation and agitation produced by thermal convection currents is maintained at a degree at which the desired settling rate of said floc is obtained.

References Cited in the file of this patent

UNITED STATES PATENTS

| 1,140,131 | Dorr | May 18, 1915 |
| 1,605,596 | Langelier | Nov. 2, 1926 |
| 2,915,299 | Woebcke | Dec. 1, 1959 |

FOREIGN PATENTS

| 457,618 | Canada | June 28, 1949 |
| 104,370 | Australia | June 24, 1938 |

OTHER REFERENCES

"Sewage Treatment," by Imhoff et al., John Wiley and Sons, Inc., New York (1956), pages 58 to 62, 72 and 73.

"Capacity and Loadings of Suspended Solids Contact Units," Jour. AWWA, vol. 43, April 1951, pp. 263–291.